United States Patent Office 3,519,281
Patented July 7, 1970

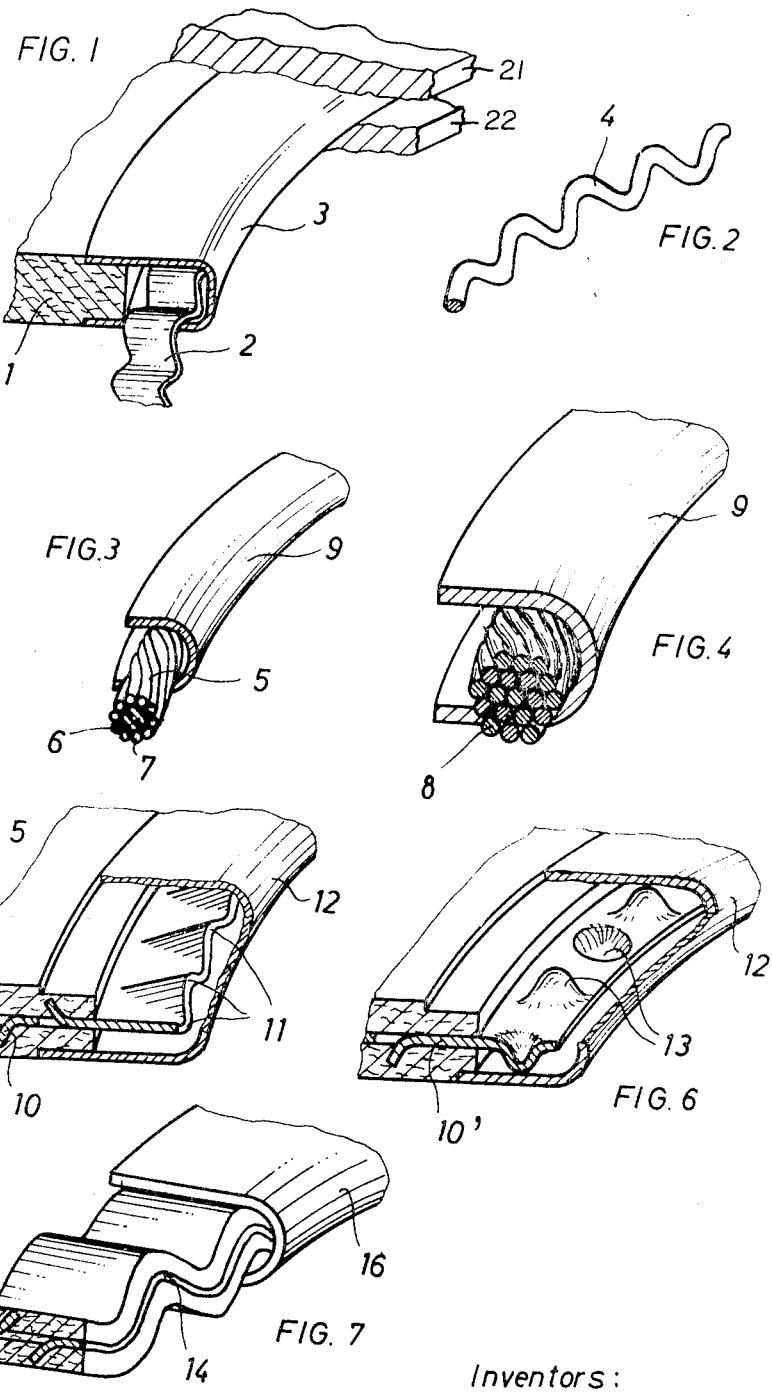

3,519,281
GASKET
Siegfried Teucher and Paul Vossieck, Burscheid, Germany, assignors to Goetzewerke Friedrich Goetze AG, Burscheid, Germany
Filed Apr. 18, 1967, Ser. No. 631,679
Claims priority, application Germany, June 15, 1966, G 47,168
Int. Cl. F16j 15/02
U.S. Cl. 277—206                    11 Claims

ABSTRACT OF THE DISCLOSURE

An improved cylinder head gasket including a sheath which at least partially surrounds a plastically deformed metal spring that is resilient in a direction at right angles to the gap to be sealed by the gasket. The spring element can be a twisted wire spring, a corrugated band spring, a plurality of twisted wire springs surrounding a resilient core, or a band spring having alternating protuberances formed therein.

BACKGROUND OF THE INVENTION

The invention relates to gaskets, particularly to cylinder-head gaskets or flange gaskets which contain a sheath that at least partially encloses a metal spring.

In order to seal flanges, particularly of cylinder heads in internal-combustion engines, a flat gasket has been developed in the past which substantially comprises a sheath having a coil spring inserted therein. The sheath has a C-shaped cross-sectional configuration and thus encloses the coil spring over approximately half of its circumference.

Such known coil springs are wound with initial tension, i.e., the coils lie closely together. The spring is stressed in a direction perpendicular to the sealing gap, i.e., transverse to the spring axis. This type of gasket is therefore particularly suited for sealing uneven sealing surfaces. Such uneven sealing surfaces are caused, for example, by machining flaws or by warping under thermal and/or mechanical stresses. Since the individual spring coils cause the covering body to conform to each rise or fall of the sealing surface, an adequate seal is provided in most instances.

It has become evident, however, particularly when the irregularities of the sealing surface are large, and when the initial tension of the spring is low, that cracks might be formed in the sheath due to vibrations of the sealing surfaces. It has been proposed to eliminate this drawback by including nonyielding supporting bodies in the gasket.

Accordingly, the principal object of this invention is to provide a simple, economical support spring which is also suited to serve as a support body to eliminate undesired vibrations and thus to eliminate cracks in the gasket sheath due to such undesired vibrations.

SUMMARY OF THE INVENTION

In accordance with this invention, the above-noted object is achieved by forming the spring which is to be enclosed in the gasket sheath from a spring wire and/or band which is plastically deformed for rendering it resilient in a direction at right angles to the gap to be sealed by the gasket. It is possible to corrugate the wire or band spring at least partially so that a spring corrugation is available at least for each unevenness of the sealing surface, the gasket sheath thus receiving the required sealing pressure.

A further possibility for imparting resiliency to the wire or to the band by means of plastic deformation consists in entirely or partially twisting the same. This twisting process can alternate over the sealing length, i.e., consist alternately of a twist to the left and a twist to the right.

An increase in resiliency as well as a deformation of the gasket sheath to produce the contact pressure forces required to bridge larger sealing gaps can be achieved by the combination of several wires and/or bands.

A minimum requirement for a satisfactory sealing function, according to this invention, is the provision of at least one corrugation, twist, or protuberance on the spring element per centimeter of sealing length or length of the sheath. It was surprisingly found that with this density of resilient supports, an adequate sealing pressure will be provided in most cases.

Finally, the resilient characteristics can be achieved by alternating impressions or proturberances in the spring band. It is further advantageous to combine the gasket according to this invention with a known metal-asbestos gasket, to form the resilient band from the supporting sheet metal of the asbestos seal, and to corrugate the supporting sheet metal and/or to stamp impressions into it. The impressions or corrugations in the sheet metal can also be covered with asbestos if desired.

The invention further provides springs which comprise a resilient and/or plastic core covered by a plurality of twisted wires. It is conceivable that, for some types of gaskets, the resilient/plastic core could be eliminated so that the twisted wires alone would provide the shock-absorbing action to eliminate vibrations.

BRIEF DESCRIPTION OF THE DRAWINGS

FIG. 1 is a cross-sectional perspective view of a flat gasket with a corrugated flat band spring of this invention partially enclosed in a sheath.

FIG. 2 is a perspective view of part of a corrugated wire spring of this invention with a circular cross section.

FIG. 3 is a cross-sectional perspective view of another spring element of this invention comprising a plurality of steel wires twisted around a resilient core.

FIG. 4 is a cross-sectional perspective view of another spring element of this invention comprising a plurality of twisted wires.

FIG. 5 is a cross-sectional perspective view of a flat asbestos gasket with a protruding corrugated sheet metal insert of this invention, the gasket being held in a metal sheath.

FIG. 6 is a cross-sectional perspective view of the flat asbestos gasket shown in FIG. 5, where the sheet metal insert is provided with alternating proturberances.

FIG. 7 is a cross-sectional perspective view of an asbestos-metal-asbestos insert enclosed in a C-shaped sheath.

DESCRIPTION OF THE PREFERRED EMBODIMENTS

In the embodiment according to FIG. 1, a sheath 3 mounted on a gasket body 1 partially encloses a plastically deformed band-type support spring 2 which is corrugated in a direction at right angles to the gap to be sealed by the gasket. Since the gasket 1 is compressed when mounted between members 21 and 22, the upper and lower corrugations of the support spring 2 press against the sheath 3, thus producing the sealing pressure required to seal the gap and also deforming the sheath 3 to follow any irregularities in the gap surfaces defined by members 21 and 22.

FIG. 2 shows a corrugated spring 4 with a circular cross section which serves the same purpose as the support spring 2 shown in FIG. 1. The support applied to sheath 3 by the spring 4, however, would not be applied along lines as is the case with corrugated band 2, but would rather be applied at upper and lower contact points.

FIGS. 3 and 4 shows further embodiments of the resilient support of this invention. In FIG. 3, a cable consisting of a resilient core 6 and a plurality of wires 7 wound closely together around the resilient core 6, is partially enclosed by a C-shaped sheath 9. In FIG. 4, the resilient core 6 is eliminated and the resilient support is provided by twisted wires 8 within the sheath 9.

FIGS. 5 and 6 show a combination of metal-asbestos gaskets in which the carrier members 10, 10' protrude towards the sealing matter and are provided with corrugations 11 or alternating protuberances 13, respectively. The corrugations or protuberances, respectively, provide the resilient support against the inner surface of a sheath 12.

FIG. 7 shows how the resilient action is achieved within a sheath 16 by corrugation of a metal strip 14 in the area of the sealing section of a combined metal-asbestos gasket.

It will be understood that the above description of the present invention is susceptible to various modifications, changes, and adaptations, and the same are intended to be comprehended within the meaning and range of equivalents of the appended claims.

We claim:

1. In a gasket for sealing a gap present between two spaced members, each member defining a respective gap surface, the gap defining a closed path transverse to the direction in which the two members are separated from one another, which gasket includes sheath means having a C-shaped cross section and extending in the direction of the path defined by the gap and engaging opposed surfaces along such path and spring means extending along such path and being at least partially surrounded by the sheath means for biasing portions of the sheath means into engagement with the gap surfaces, the improvement wherein said spring means has the shape of a sheet of resilient material with a series of raised portions bent out from the sheet in the direction between the gap surfaces for biasing portions of the sheath means into engagement with the gap surfaces, said raised portions being spaced from one another in the direction of the path defined by the gap.

2. A gasket as defined in claim 1 in which the spring element is corrugated.

3. A gasket as defined in claim 2, in which the corrugation ridges of the spring extend in a direction which is perpendicular to the direction of elongation of the sheath.

4. A gasket as defined in claim 3, in which the spring element corrugations have a uniform cross section across the entire width of the sheet.

5. A gasket as defined in claim 1, in which a soft gasket material is mounted within the sheath.

6. A gasket as defined in claim 5 in which a portion of the spring element is embedded in the soft material.

7. In a gasket as defined in claim 6, a spring element which is substantially flat along one edge, which edge is embedded in said soft material, and is corrugated along the other edge.

8. A gasket as defined in claim 1 wherein said spring element has at least one raised portion per centimeter of sealing length as measured along the surface of said sheath.

9. A gasket as defined in claim 1 and further comprising protuberances extending alternately in opposite directions from said metal spring.

10. A gasket as defined in claim 1 and further comprising a supporting plate made of asbestos and metal, said sheath and said spring element being attached to said supporting plate to form a unitary sealing structure, and said spring element being corrugated along its entire length.

11. A gasket as defined in claim 1 and further comprising a supporting plate made of asbestos and metal, said sheath and said spring element being attached to said supporting plate to form a unitary sealing structure, and said spring element containing resilient impressions along its entire length.

References Cited

UNITED STATES PATENTS

| 1,819,694 | 8/1931 | Sperry. |
| 2,580,546 | 1/1952 | Hobson 277—232 |
| 3,184,245 | 5/1965 | Woolcott 277—142 X |

FOREIGN PATENTS

| 1,050,620 | 2/1959 | Germany. |
| 1,216,634 | 5/1966 | Germany. |

LAVERNE D. GEIGER, Primary Examiner

J. S. MEDNICK, Assistant Examiner

U.S. Cl. X.R.

277—228, 235